US008430513B2

(12) United States Patent
Chang et al.

(10) Patent No.: US 8,430,513 B2
(45) Date of Patent: Apr. 30, 2013

(54) PROJECTION SYSTEM WITH EXTENDING DEPTH OF FIELD AND IMAGE PROCESSING METHOD THEREOF

(75) Inventors: Chuan Chung Chang, Zhubei (TW); Hsin Yueh Sung, Yonghe (TW); Chir Weei Chang, Longtan Shiang (TW)

(73) Assignee: Industrial Technology Research Institute, Chutung, Hsinshu (TW)

( * ) Notice: Subject to any disclaimer, the term of this patent is extended or adjusted under 35 U.S.C. 154(b) by 225 days.

(21) Appl. No.: 12/831,569

(22) Filed: Jul. 7, 2010

(65) Prior Publication Data

US 2011/0249028 A1 Oct. 13, 2011

(30) Foreign Application Priority Data

Apr. 9, 2010 (TW) ............................... 99111007 A

(51) Int. Cl.
*G03B 21/14* (2006.01)
(52) U.S. Cl.
USPC ............... 353/98; 353/30; 353/31; 353/34; 353/37; 353/94; 353/97; 353/99; 353/122; 382/255; 382/279
(58) Field of Classification Search ............ 353/20, 353/22, 30, 31, 33, 34, 37, 84, 94, 97, 98, 353/99, 122; 359/637, 708, 722, 723, 709, 359/620; 382/255, 279, 284
See application file for complete search history.

(56) References Cited

U.S. PATENT DOCUMENTS

| | | | |
|---|---|---|---|
| 3,609,012 A * | 9/1971 | Street ............................ | 359/715 |
| 4,770,509 A * | 9/1988 | Hayashi et al. ............... | 359/682 |
| 5,617,252 A * | 4/1997 | Manhart et al. .............. | 359/653 |
| 5,662,400 A * | 9/1997 | Shikama et al. ............... | 353/31 |
| 6,069,738 A | 5/2000 | Cathey, Jr. et al. | |
| 7,088,419 B2 | 8/2006 | Dowski, Jr. et al. | |
| 7,511,895 B2 * | 3/2009 | George et al. .................. | 359/722 |
| 7,679,721 B2 * | 3/2010 | Clauss ............................ | 355/67 |
| 7,948,550 B2 * | 5/2011 | Robinson et al. ............. | 348/335 |
| 8,143,600 B2 * | 3/2012 | Seibel et al. ............... | 250/461.2 |
| 2003/0039029 A1 * | 2/2003 | Suzuki .......................... | 359/432 |
| 2003/0197838 A1 * | 10/2003 | Kohno ............................ | 353/97 |

FOREIGN PATENT DOCUMENTS

CN 2468068 Y 12/2001
CN 101048691 A 10/2007

OTHER PUBLICATIONS

Edward R. Dowski, Jr., and W. Thomas Cathey "Extended depth of field through wave-front coding", Apr. 10, 1995, vol. 34, No. 11, pp. 1859-1866, Applied Optics.
Po-Chang Chen, et al. "Digital Decoding Design for Phase Coded Imaging System", Applications of Digital Image Processing XXXII, edited by Andrew G. Tescher, Proc. of SPIE, vol. 7443, 74431A • © 2009 SPIE • CCC code: 0277-786X/09/$18 • doi: 10.1117/12.825459.
Hsin-Yueh Sung, et al. "Design of Mobile Phone Lens with Extended Depth of Field Based on Point-spread Function Focus Invariance", Novel Optical Systems Design and Optimization XI, edited by R. John Koshel, G. Groot Gregory, James D. Moore Jr., David H. Krevor, Proc. of SPIE vol. 7061, 706107 • © 2008 SPIE, CCC code: 0277-786X/08/$18 • doi: 10.1117/12.794079.
May 3, 2012 Office Action for Chinese counterpart application.
May 3, 2012 Office Action for Chinese counterpart application translated into English.

* cited by examiner

*Primary Examiner* — Georgia Y Epps
*Assistant Examiner* — Sultan Chowdhury
(74) *Attorney, Agent, or Firm* — Egbert Law Offices, PLLC

(57) ABSTRACT

A projection system comprises an image input element and an optical imaging element. The image input element is configured to input an original image or a processed image. The optical imaging element, an optical system with axisymmetrical structure and specific spherical aberration, is configured to generate an image with extended depth of field on an image projection surface in accordance with the original image or the processed image.

21 Claims, 9 Drawing Sheets

PROJECTION SYSTEM WITH EXTENDING DEPTH OF FIELD AND IMAGE PROCESSING METHOD THEREOF

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The disclosure relates to a projection system with extending depth of field and the image processing method thereof.

2. Description of Related Art Including Information Disclosed Under 37 CFR 1.97 and 37 CFR 1.98

Image processing systems are widely used in various kinds of applications. In addition to ordinary image function, image processing systems used in specific applications are usually required to have the capability to extend depth of field. Most ordinary imaging systems are required to have sharp image and faster imaging, i.e. small F-number, to enhance light energy usage efficiency. However, imaging systems with small F-number exhibit short depth of field. With projection systems, for example, due to the restriction of the conjugation relation between object and image, the image projected by a projection system will become blurry when the projection screen moves away from the optimum projection distance, unless a focus adjustment procedure is performed to the imaging lens of the projection system.

In addition to projection systems, an exposure system can increase its structural depth to width ratio after the exposure process if the exposure system has the feature of extending depth of field.

U.S. Pat. No. 6,069,738 discloses a projection system, which uses an image coder to generate a coded image of a desired projection image by an extended depth of field (EDF) mask and a known required image. After generating the coded image, the projection system provides the coded image to a light encoder to generate an encoded light. A project image, of which the clearance will not change with the location of the projection screen, can be produced after the encoded light passes through the EDF mask.

The development of projection systems with extending depth of field is vital for industry. In addition, users expect a projection system in which the image clearance is not sensitive to the location of the projection screen, and the projection lens thereof does not require additional focus adjustment.

Accordingly, there is a need to reduce the calculation load, to establish a forwarding protocol among cameras, and to implement a front-end embedded system, so as to meet industrial requirements.

BRIEF SUMMARY OF THE INVENTION

This disclosure provides a projection system with extending depth of field and the method thereof. One embodiment discloses a projection system with extending depth of field, comprising an image input element and an optical imaging element. The image input element is configured to input an original image or a processed image. The optical imaging element is configured to generate an image with extended depth of field on an image projection surface in accordance with the original image or the processed image. The optical imaging element is an optical system with an axisymmetrical structure and has a specific spherical aberration.

Another embodiment discloses an image processing method for extending depth of field, comprising the steps of: generating a pre-process image according to an original image and a point spread function of an optical imaging element or by performing a convolution operation on an original image; generating a numerical translation image by executing a numerical translation procedure based on the pre-process image; and generating a processed image by executing a dynamic range adjustment procedure based on the numerical translation image.

BRIEF DESCRIPTION OF THE SEVERAL VIEWS OF THE DRAWINGS

The accompanying drawings, which are incorporated in and constitute a part of this specification, illustrate embodiments of the disclosure and, together with the description, serve to explain the principles of the disclosure.

DETAILED DESCRIPTION OF THE INVENTION

Figure 1:
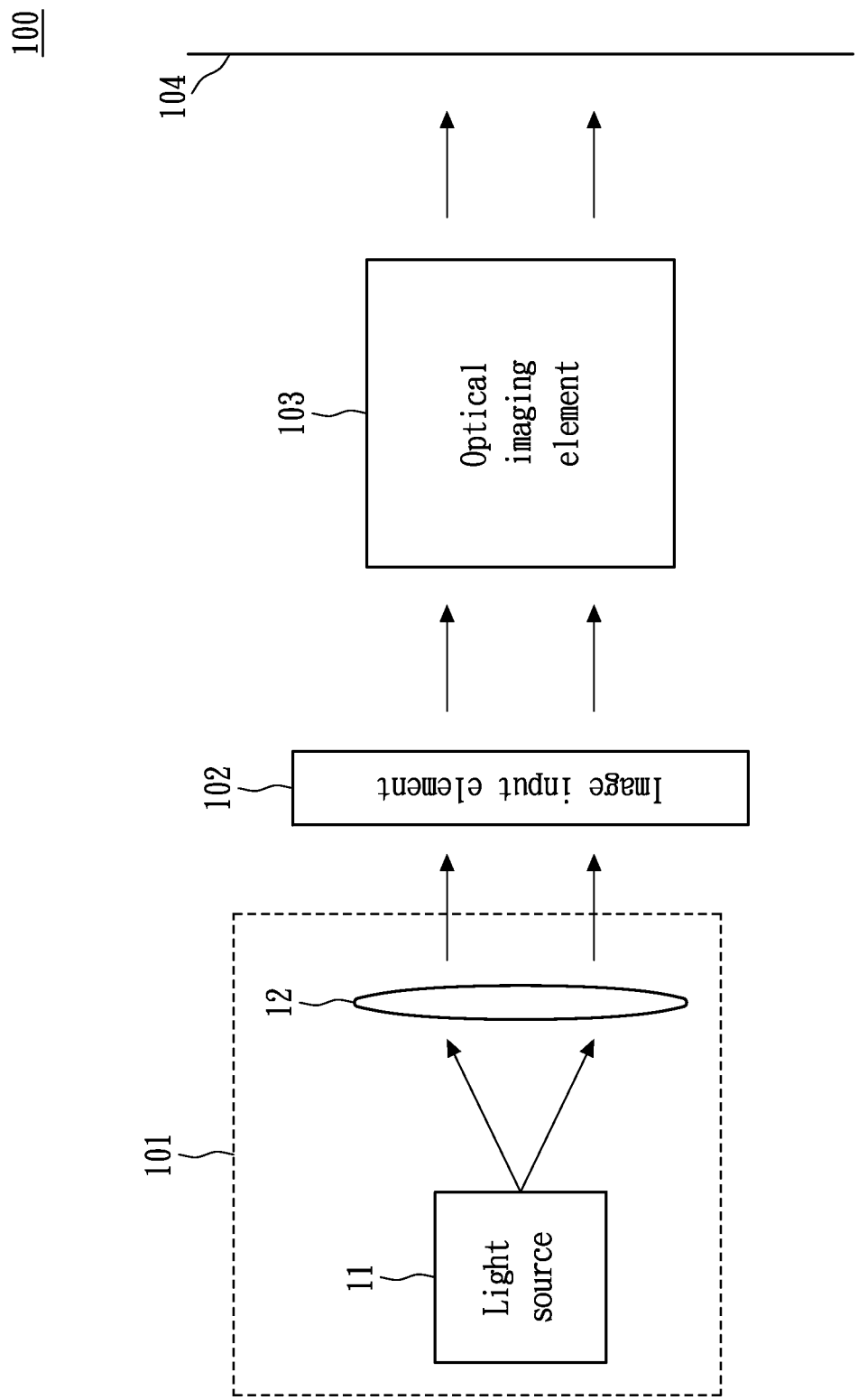
FIG. 1 illustrates a schematic view of a projection system with extending depth of field according to an embodiment of this disclosure.

According to an embodiment of this disclosure, FIG. 1 illustrates a projection system 100 with extending depth of field. The projection system 100 comprises a light source device 101, an image input element 102 and an optical imaging element 103. According to an embodiment of this disclosure, the light source device 101 comprises a light source 11 and a collection lens 12. The image input element 102 is configured to input an original image or a processed image. According to an embodiment of this disclosure, the image input element 102 can be a liquid crystal display (LCD) element, a digital mirror device (DMD), a liquid crystal on silicon (LCoS) element, or a mask. According to an embodiment of this disclosure, the original image is a standard Lena image. The optical imaging element 103 has a specific spherical aberration, and is configured to generate an image with extended depth of field on an image projection surface 104 in accordance with the original image or the processed image. According to an embodiment of this disclosure, the image input element 102 and the optical imaging element 103 are deployed between the light source device 101 and the image projection surface 104.

The specific spherical aberration of the optical imaging element 103 comprises a specific third-order spherical aberration. According to an embodiment of this disclosure, the specific spherical aberration further comprises a high order spherical aberration with order higher than the specific third-order spherical aberration, and the magnitude of the high order spherical aberration is much lower than that of the specific third-order spherical aberration. According to an embodiment of this disclosure, if the optical imaging element 103 is an ordinary optical imaging element, a specifically-configured element can be added to the optical imaging element 103 to achieve the specific third-order spherical aberration. For example, the specific third-order spherical aberration can be generated by a phase mask, an amplitude mask, a phase-amplitude mask, a diffraction optical element, a refractive index gradient element, or a combination of the aforementioned components, e.g. a combination of two phase-amplitude masks or a combination of an amplitude mask, a phase-amplitude mask and a diffraction optical element. The additional specifically-configured element can be deployed at the aperture, the entrance pupil or the exit pupil of the optical imaging element 103. The additional specifically-configured element can also be deployed at the front or behind the optical imaging element 103. In other words, the deployment of the additional specifically-configured element is not restricted as long as the aberration of the projection system meets the specific aberration distribution of this disclosure.

According to another embodiment of this disclosure, if the optical imaging element 103 is reconfigured, the aforementioned specifically-configured element can be integrated into the optical imaging element 103. That is, the specific third-order spherical aberration of the optical imaging element 103 is generated by a reconfigured spherical lens optical element, an aspheric lens optical element with axisymmetrical structure, or a combination of the aforementioned components, e.g. a combination of two spherical lens optical elements or a combination of two aspheric lens optical element and an aspheric lens optical element with axisymmetrical structure. Further, the specific third-order spherical aberration can be generated by installing a phase mask, an amplitude mask, a phase-amplitude mask, a diffraction optical element or a refractive index gradient element on one or more spherical lens or aspheric lens, e.g. installing a phase mask on two spherical lenses. However, the generation of the specific third-order spherical aberration is not limited to the aforementioned embodiments.

The optical system with an axisymmetrical structure of this embodiment means that the optical imaging element 103, e.g. a projecting lens, has a fixed optical axis. If the optical imaging element 103 rotates relative to the optical axis, the structure and characteristic of the optical imaging element 103 remain unchanged regardless of the rotation angles.

According to an embodiment of this disclosure, the image input element 102 has a liquid crystal display (LCD) element. According to an embodiment of this disclosure, the specific third-order spherical aberration is determined by the required depth of field (variation of projection distance) of the projection system 100. For example, at a specific required depth of field, the specific third-order spherical aberration of the optical imaging element 103 can be configured to be within a certain range, e.g. 0.25λ-2.85λ. According to an embodiment of this disclosure, if a required system cutoff spatial frequency (v-cutoff) is larger than ⅔λ, the specific third-order spherical aberration can be configured as 2.35λ, wherein v-cutoff is the cutoff spatial frequency corresponding to a single pixel of an LCD element, v-cutoff is a system cutoff spatial frequency when the spherical aberration is within 0.25λ-2.85λ, and λ is the wavelength of the light. Therefore, if a lower cutoff spatial frequency is required, which corresponds to a single pixel with large size of an LCD element, the third-order spherical aberration can be enlarged to lengthen the depth of field of the projection system 100.

In addition to the specific third-order spherical aberration, the specific spherical aberration of the optical imaging element 103 may also comprise high-order spherical aberration, which may be generated during the configuration process, or may be due to a production error. Accordingly, the sum of the coefficients of high-order spherical aberrations, e.g. fifth-order, seventh-order or higher order spherical aberration, of the optical imaging element 103 according to the embodiments of this disclosure is less than the coefficient of third-order spherical aberration. Therefore, the characteristic of depth of field of the projection system 100 is dominated by the specific spherical third-order aberration. According to an embodiment of this disclosure, the relation between each spherical aberration versus the total phase difference of the optical imaging element 103 can be described by the following function:

$$W(\rho) = \\ W040\rho^4 - W060\left(\frac{\Delta z}{f}\right)\rho^6 + W080\left(\frac{\Delta z}{f}\right)^2\rho^8 - W0100\left(\frac{\Delta z}{f}\right)^3\rho^{10} + \ldots \quad (1)$$

wherein $W(\rho)$ is the total wavefront of the projection lens, $\rho$ is the normalized exit pupil radius of the optical imaging element 103, $W040 \sim W100$ are the coefficients of each spherical aberration, $\Delta z$ is the depth of field of the projection system 100, and is the effective focal length of the optical imaging element 103.

Figure 2A:
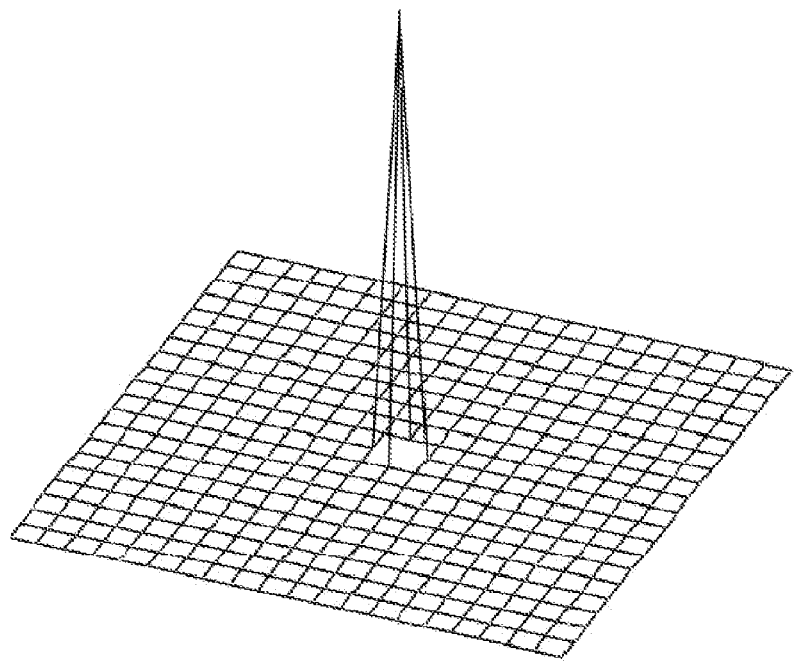
FIG. 2A shows a graphical view of the three-dimensional distribution of a point spread function according to an embodiment of this disclosure.
Figure 2B:
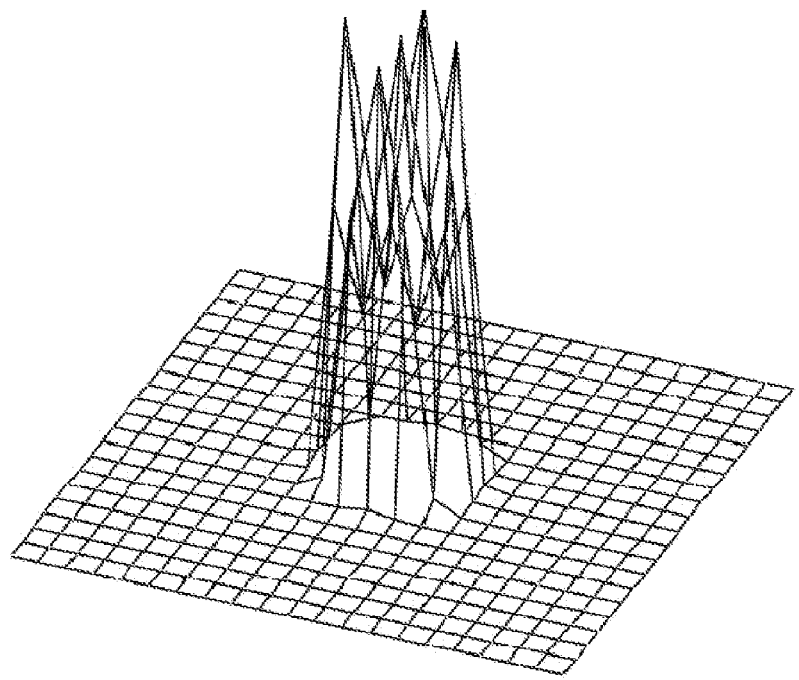
FIG. 2B shows a graphical view of the three-dimensional distribution of another point spread function according to an embodiment of this disclosure.
Figure 3A:
FIG. 3A shows a projected image according to an embodiment of this disclosure.
Figure 3B:
FIG. 3B shows another projected image according to an embodiment of this disclosure.
Figure 4A:
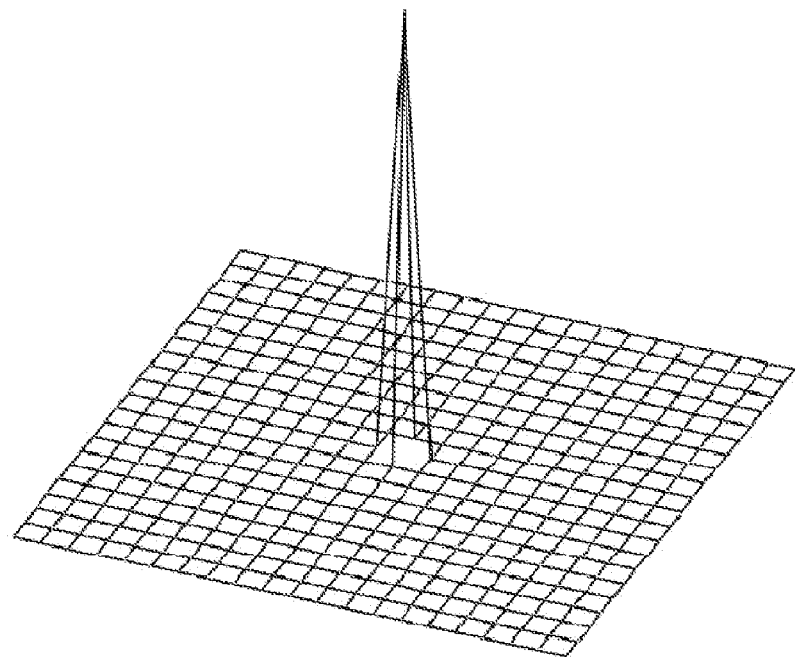
FIG. 4A shows a graphical view of the three-dimensional distribution of another point spread function according to an embodiment of this disclosure.
Figure 4B:
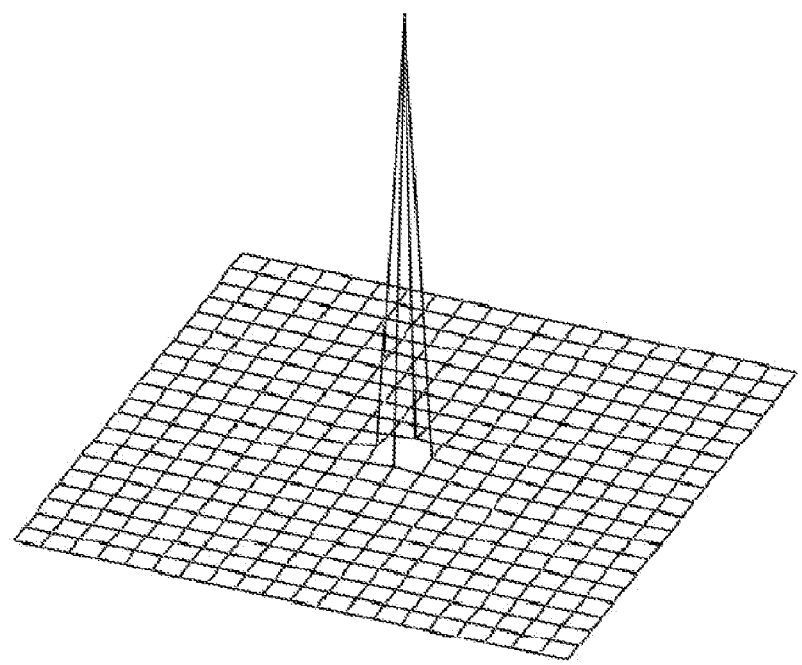
FIG. 4B shows a graphical view of the three-dimensional distribution of another point spread function according to an embodiment of this disclosure.
Figure 5A:
FIG. 5A shows another projected image according to an embodiment of this disclosure.
Figure 5B:
FIG. 5B shows another projected image according to an embodiment of this disclosure.

According to an embodiment of this disclosure, the image input element 102 is an LCD element with diagonal measurement of 0.47 inches. The pixel size is 7.5×10 micrometers. The F-number is 1.75. The effective focal length is 14.479 millimeters. The optimum projection distance is 45 centimeters. If the optical imaging element 103 is a traditional lens, FIG. 2A shows the three-dimensional distribution of the point spread function of the optimum image plane. When the image input element 102 is +/−0.05 millimeters away from the optimum image plane of the optical imaging element 103, the three-dimensional distribution of the point spread function is shown in FIG. 2B. Specifically, based on the effective focal length of the optical imaging element 103, the +/−0.05 millimeters distance from the optimum image plane corresponds to a change of object distance from 40.9 centimeters to 50 centimeters. FIGS. 3A and 3B show the projected image by imaging element which point spread functions have shown in FIGS. 2A and 2B when the object distances are 45 centimeters and 50 centimeters, respectively, if the input image is a standard Lena image. According to an embodiment of this disclosure, if the coefficient of the specific third-order spherical aberration of the optical imaging element 103 is configured as 3.5 times the wavelength, the three-dimensional distribution of the point spread function of the optimum image plane is shown in FIG. 4A. FIG. 4B shows the three-dimensional distribution of the point spread function when the image input element 102 is +/−0.05 millimeters away from the optimum image plane of the optical imaging element 103. FIGS. 5A and 5B show the projected image by imaging element of the projection system 100 which point spread functions have shown in FIGS. 4A and 4B when the object distances are 45 centimeters and 50 centimeters, respectively, if the input image is a standard Lena image.

Figure 6:
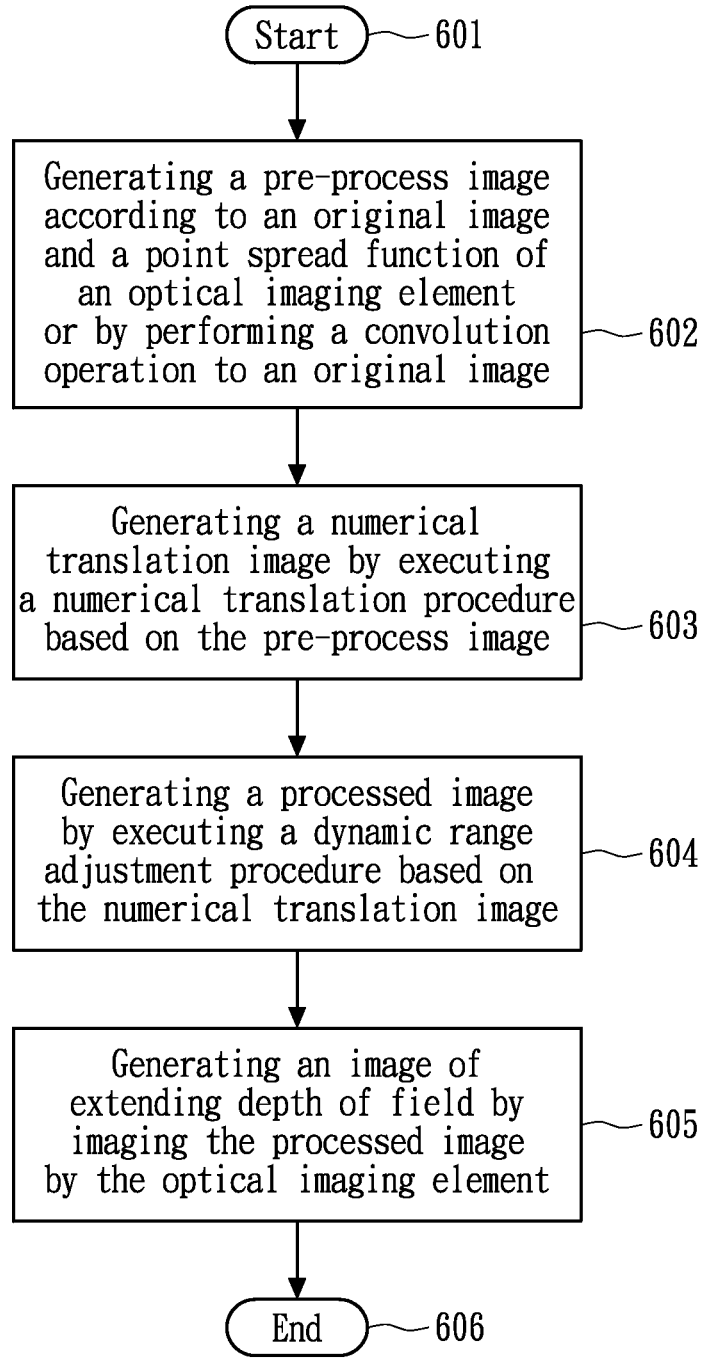
FIG. 6 is a flowchart illustrating an exemplary embodiment of the image processing method for extending depth of field.
Figure 7:
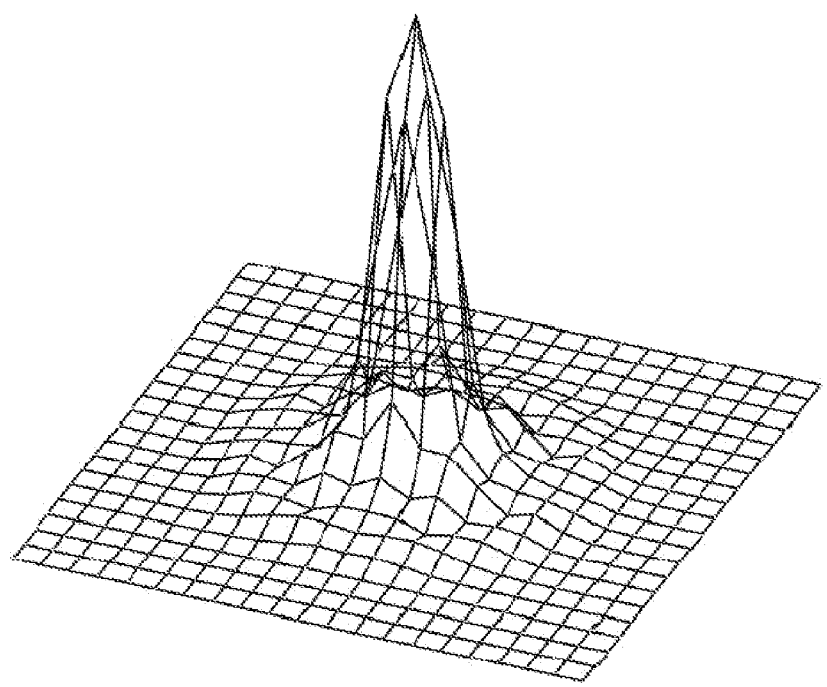
FIG. 7 shows a graphical view of the three-dimensional distribution of another point spread function according to an embodiment of this disclosure.

FIG. 6 is a flowchart illustrating an exemplary embodiment of the image processing method for extending depth of field. The method for extending depth of field starts in step 601. FIG. 7 shows the three-dimensional distribution of another point spread function according to an embodiment of this disclosure, wherein an image input element is +/−0.08 millimeters away from the optimum image plane of an optical imaging element. The optical imaging element has a specific spherical aberration, wherein the specific spherical aberration comprises a specific third-order spherical aberration. The specific spherical aberration further comprises at least a high order spherical aberration with order higher than the specific third-order spherical aberration, and the magnitude of the high order spherical aberration is much lower than that of the specific third-order spherical aberration. In step 602, a pre-process image is generated according to an original image and a point spread function of an optical imaging element or by performing a convolution operation on an original image. According to an embodiment of this disclosure, if the point spread function of an ideal projection system is represented by a Delta function, an original image, e.g. a standard Lena image, is represented by O(x, y) function, the image I(x, y) generated by the ideal projection system can be represented by the following function:

$$O(x,y) \otimes \delta_z(x,y) = I(x,y) \qquad (2)$$

According to an embodiment of this disclosure, if the point spread function of the optical imaging element is represented by h(x, y), the relation between a pre-preprocessed image O'(x, y), the point spread function h(x, y), and the generated image I(x, y) can be represented by the following function:

$$O'(x,y) \otimes h(x,y) = I(x,y) \qquad (3)$$

Performing Fourier transform to functions (2) and (3) to convert to frequency domain, the following functions can be obtained:

$$\Im\{O(x,y)\} \widetilde{\otimes} \{\delta_z(x,y)\} = \Im\{I(x,y)\} \qquad (4)$$

$$\Im\{O'(x,y)\} \Im\{h(x,y)\} = \Im\{I(x,y)\} \qquad (5)$$

Dividing functions (5) with functions (4), the pre-preprocessed image O'(x, y) can be obtained:

$$O'(x, y) = \Im^{-1}\left\{\frac{\Im\{O(x, y)\}}{\Im\{h(x, y)\}}\right\} \qquad (6)$$

According to functions (6), the intensity distribution of the O'(x, y) function in space can be determined as long as the original image and the point spread function of the optical imaging element is known. According to an embodiment of this disclosure, the pre-processed image can also be obtained by performing convolution operation to the required projection image by a filter kernel exhibiting a specific spatial dimensional magnitude.

Figure 8:
FIG. 8 shows another projected image according to an embodiment of this disclosure.

In addition, there is a need to determine whether the smallest intensity of the pre-processed function O'(x, y) is greater than zero. There is also a need to determine whether the distribution of the greatest and smallest intensity of the pre-processed function O'(x, y) matches the gray scale display range (dynamic range) of the image input element. Therefore, in step 603, a numerical translation image is generated by executing a numerical translation procedure based on the pre-process image. The numerical translation procedure is configured to translate intensity indexes of each pixel of the pre-processed image such that the image intensity index corresponding to the pixel with the lowest intensity of the numerical translation image is equal to or greater than zero. In step 604, a processed image is generated by executing a dynamic range adjustment procedure based on the numerical translation image. The dynamic range adjustment procedure is configured to adjust intensity indexes of each pixel of the numerical translation image such that an intensity distribution of pixels of the processed image matches a gray scale dynamic range of an image input element. After the dynamic range adjustment procedure, the processed image is loaded into the image input element. In step 605, an image of extending depth of field is generated by imaging the processed image by the optical imaging element. FIG. 8 shows a projected image when the object distance is 53.6 centimeters according to an embodiment of this disclosure. Finally, the method is finished in step 606.

Figure 9:
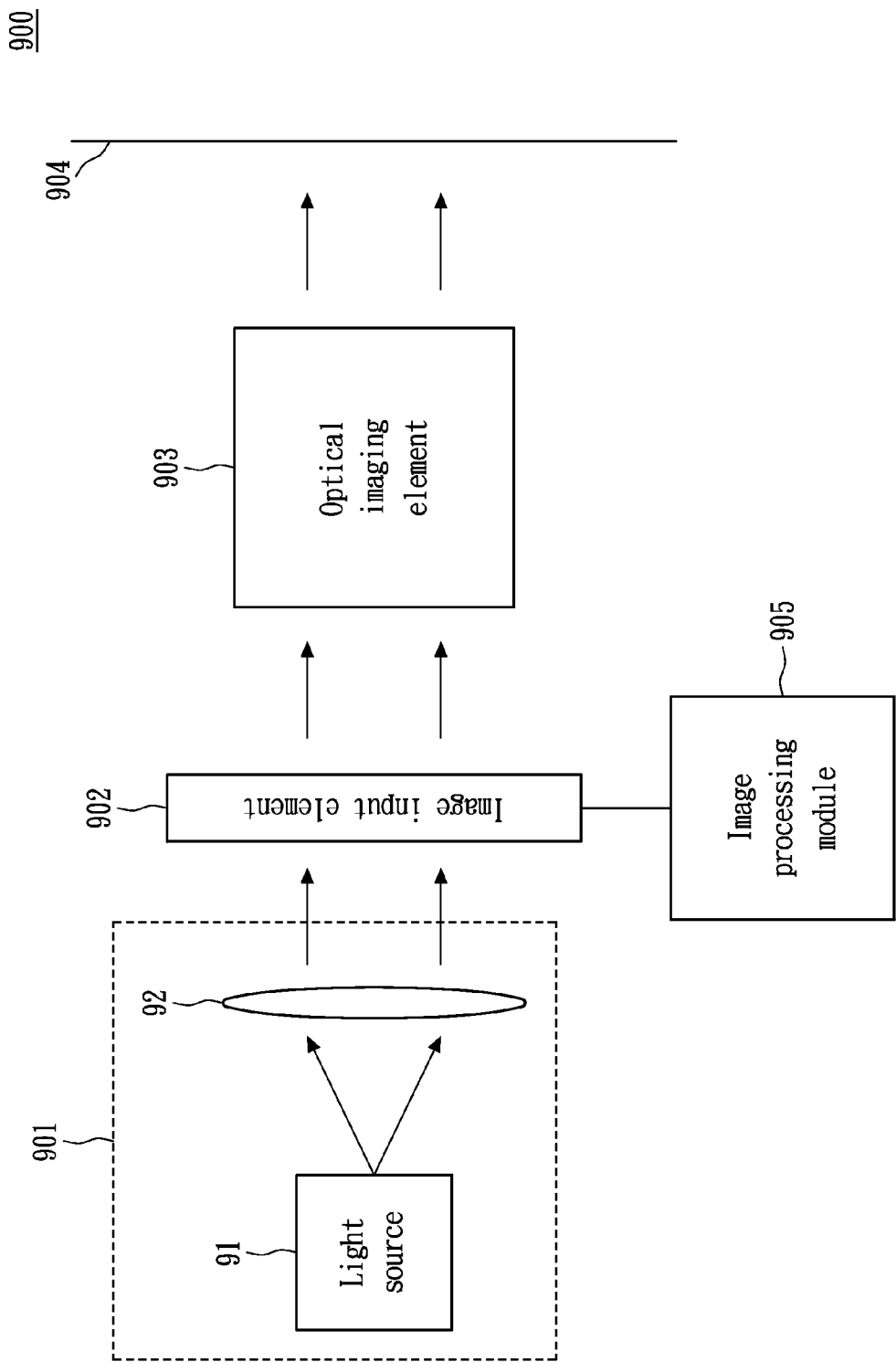
FIG. 9 illustrates a schematic view of a projection system with extending depth of field according to another embodiment of this disclosure.

According to another embodiment of this disclosure, FIG. 9 illustrates a projection system 900 with extending depth of field according to another embodiment of this disclosure. The projection system 900 comprises a light source device 901, an image input element 902, an optical imaging element 903 and an image processing module 905. According to an embodiment of this disclosure, the light source device 901 comprises a light source 91 and a collection lens 92. The image input element 902 is configured to input an original image or a processed image. According to an embodiment of this disclosure, the image input element 902 comprises a liquid crystal display (LCD) element, a digital mirror device (DMD), a liquid crystal on silicon (LCoS) element or a mask. According to an embodiment of this disclosure, the original image is a standard Lena image. The optical imaging element 903 has a specific spherical aberration, and is configured to generate an image with extended depth of field on an image projection surface 904 in accordance with the original image or the processed image. According to an embodiment of this disclosure, the image input element 902 and the optical imaging element 903 are deployed between the light source device 901 and the image projection surface 904. The image processing module 905 is configured to perform an image processing procedure, comprising the steps of generating a pre-process image according to an original image and a point spread function of an optical imaging element or by performing a convolution operation to an original image; generating a numerical translation image by executing a numerical translation procedure based on the pre-process image; and generating a processed image by executing a dynamic range adjustment procedure based on the numerical translation image.

The above-described exemplary embodiments are intended to be illustrative only. Those skilled in the art may devise numerous alternative embodiments without departing from the scope of the following claims.

We claim:

1. A projection system with an extending depth of field comprising:
   an image input element configured to input an original image or a processed image; and
   an optical imaging element configured to generate an image with an extended depth of field on an image projection surface in accordance with the original image or the processed image;
   wherein the optical imaging element is an optical system with an axisymmetrical structure and has a specific spherical aberration.

2. The projection system of claim 1, further comprising a light source device, wherein the image input element and the optical imaging element are deployed between the light source device and the image projection surface.

3. The projection system of claim 1, further comprising an image processing module configured to execute an image processing procedure, wherein the image processing procedure comprises:
   generating a pre-process image based on the original image and a point spread function of the optical imaging element or by performing a convolution operation to an original image;
   generating a numerical translation image by executing a numerical translation procedure based on the pre-process image; and
   generating the processed image by executing a dynamic range adjustment procedure based on the numerical translation image.

4. The projection system of claim 1, wherein the specific spherical aberration comprises a specific third-order spherical aberration.

5. The projection system of claim 4, wherein the specific spherical aberration further comprises a high order spherical aberration with order higher than the specific third-order spherical aberration, and a magnitude of the high order spherical aberration is much lower than that of the specific third-order spherical aberration.

6. The projection system of claim 4, wherein the specific third-order spherical aberration is generated by at least a phase mask, an amplitude mask or a phase-amplitude mask.

7. The projection system of claim 4, wherein the specific third-order spherical aberration is generated by at least an optical element with an aspheric lens and an axisymmetrical structure.

8. The projection system of claim 4, wherein the specific third-order spherical aberration is generated by at least a diffraction optical element.

9. The projection system of claim 4, wherein the specific third-order spherical aberration is generated by at least a refractive index gradient element.

10. The projection system of claim 4, wherein the specific third-order spherical aberration is generated by at least an optical element with a spherical lens.

11. The projection system of claim 4, wherein the specific third-order spherical aberration is generated by a phase mask, an amplitude mask, a phase-amplitude mask, a diffraction optical element or a refractive index gradient element installed on at least an aspheric lens.

12. The projection system of claim 4, wherein the specific third-order spherical aberration is generated by a phase mask, an amplitude mask, a phase-amplitude mask, a diffraction optical element or a refractive index gradient element installed on at least a spherical lens.

13. The projection system of claim 1, wherein the image input element comprises a liquid crystal display (LCD) element, a digital mirror device (DMD), a liquid crystal on silicon (LCoS) element or a mask.

14. The projection system of claim 4, wherein the specific third-order spherical aberration is determined by a requirement of the projection system with extending depth of field.

15. An image processing method for extending depth of field, the image processing method comprising the steps of:
   generating a pre-process image according to an original image and a point spread function of an optical imaging element or by performing a convolution operation to an original image;
   generating a numerical translation image by executing a numerical translation procedure based on the pre-process image; and
   generating a processed image by executing a dynamic range adjustment procedure based on the numerical translation image.

16. The image processing method of claim 15, further comprising a step of generating an image of extending depth of field by imaging the processed image by the optical imaging element.

17. The image processing method of claim 15, wherein the optical imaging element has a specific spherical aberration.

18. The image processing method of claim 17, wherein the specific spherical aberration comprises a specific third-order spherical aberration.

19. The image processing method of claim 18, wherein the specific spherical aberration further comprises a high order spherical aberration with an order higher than the specific third-order spherical aberration, and a magnitude of the high order spherical aberration is much lower than that of the specific third-order spherical aberration.

20. The image processing method of claim 15, wherein the numerical translation procedure is configured to translate intensity indexes of each pixel of the pre-processed image such that an image intensity index corresponding to the pixel with a lowest intensity of the numerical translation image is equal to or greater than zero.

21. The image processing method of claim 15, wherein the dynamic range adjustment procedure is configured to adjust intensity indexes of each pixel of the numerical translation image such that an intensity distribution of pixels of the processed image matches a gray scale dynamic range of an image input element.

* * * * *